July 11, 1967 W. A. KIRK 3,330,410
CITRUS SEED SEPARATOR
Filed Aug. 24, 1965 2 Sheets-Sheet 1

INVENTOR
WILLIAM A. KIRK

BY
ATTORNEYS

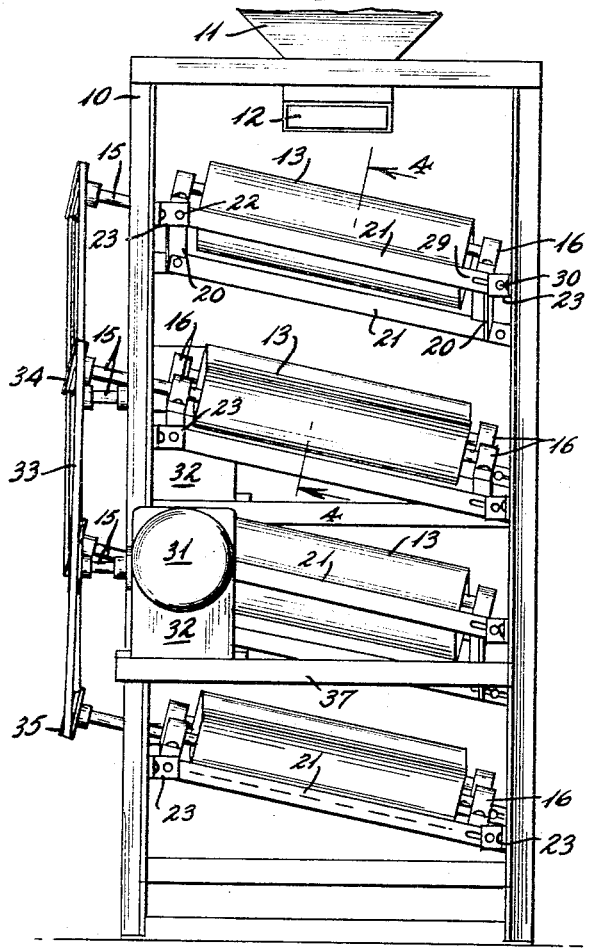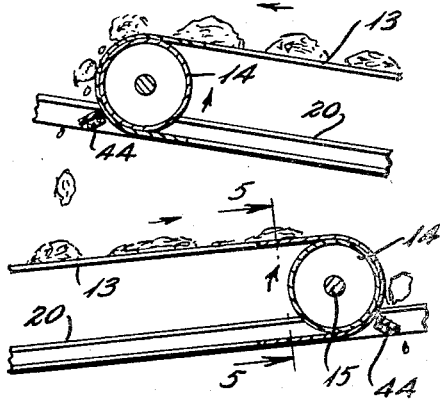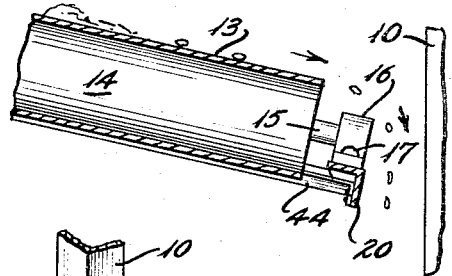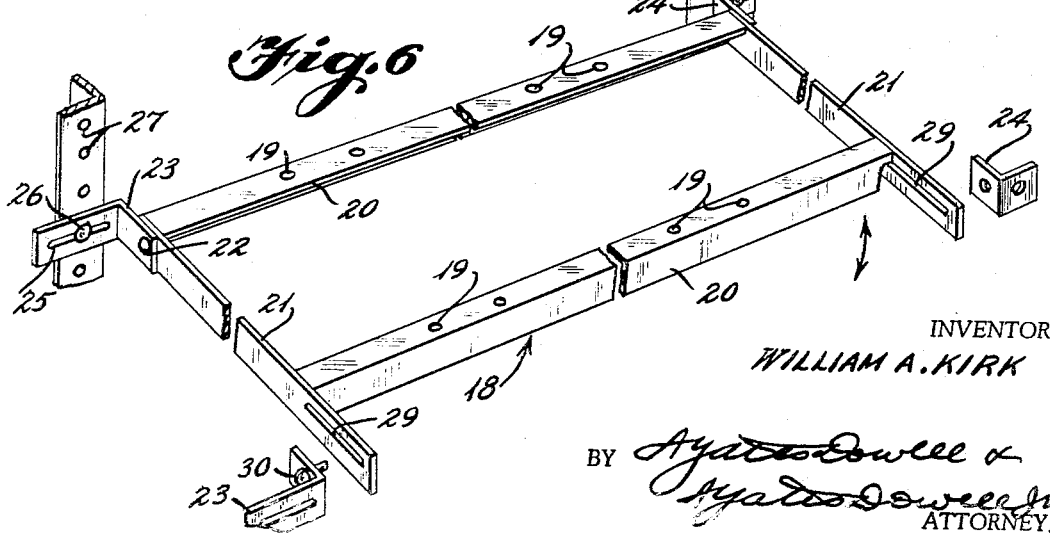

3,330,410
CITRUS SEED SEPARATOR
William A. Kirk, Lakeland, Fla., assignor to Imperial Citrus By-Products, Inc., Lakeland, Fla., a corporation of Florida
Filed Aug. 24, 1965, Ser. No. 482,200
4 Claims. (Cl. 209—114)

ABSTRACT OF THE DISCLOSURE

A separator having a plurality of conveyors in overlapping arrangement and each conveyor normally being inclined longitudinally and transversely to separate seed from pulp by impact and permitting the hard seed to roll off of the conveyors.

---

This invention relates to article or material separation and to apparatus and equipment by which such separation is accomplished.

The invention relates particularly to the separation of citrus pulp and seed after the juice has been removed from citrus fruit, and to a machine by which this result is accomplished.

Much research has been made and much effort has been given to finding a worthwhile use for the discard from various substances, including from citrus fruit and in so doing it has been found desirable to separate the seed from the pulp for certain useful applications thereof. Considerable difficulty has been experienced in solving this problem.

It is an object of the invention to provide a simple, practical machine which will satisfactorily, efficiently and economically perform the desired separation operation.

Another object of the invention is to provide a machine which includes a hopper and a series of belts inclined both lengthwise and transversely so that the pulp will cling to the belts and the seeds will roll off, as well as supporting and driving means for the belt and collection means for the seed.

Figure 1:
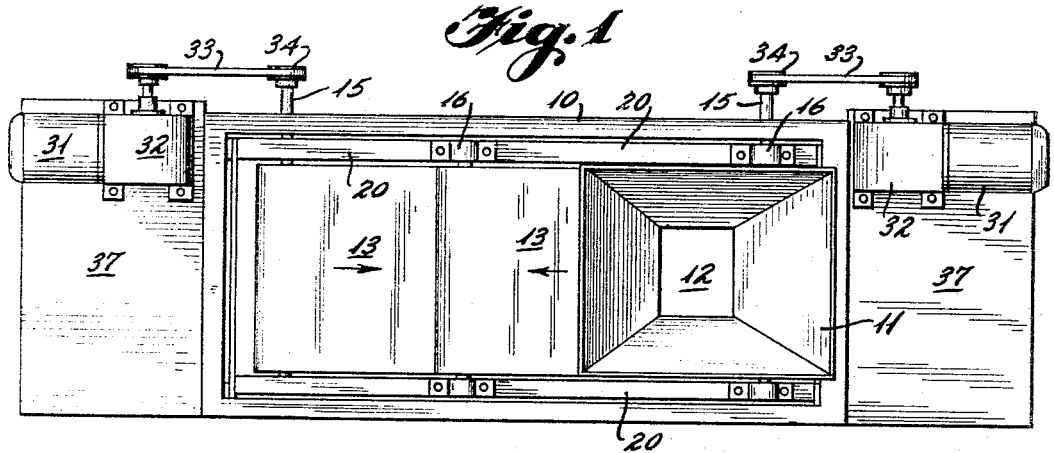
Figure 2:
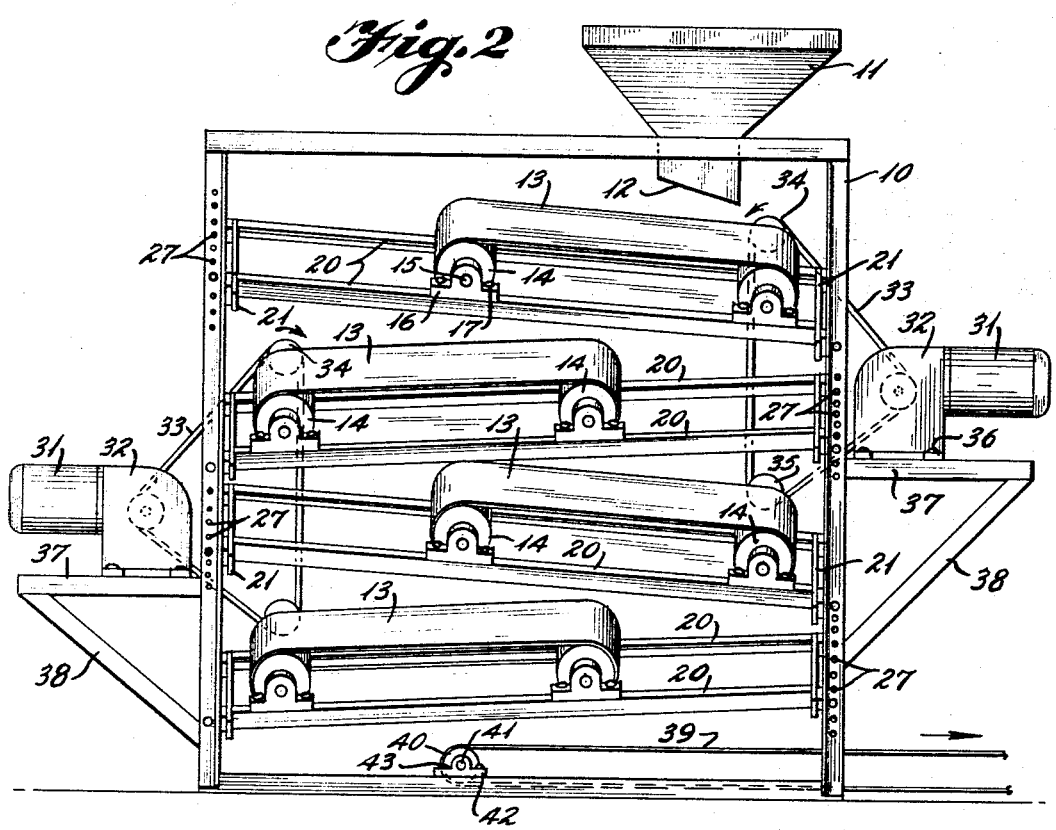

Other objects and advantages of the invention will be apparent from the following description taken in conjunction with the accompanying drawings in which:

FIG. 1 is a top plan view illustrating one application of the invention;

FIG. 2, a side elevation;

FIG. 3, an end elevation;

FIG. 4, a fragmentary detailed section on the line 4—4 of FIG. 3;

FIG. 5, a fragmentary section on the line 5—5 of FIG. 4; and,

FIG. 6, a detailed perspective of a mounting frame for each of the conveyor belts.

Briefly stated the machine of the present invention comprises a frame on the upper portion of which is supported a hopper for matter to be separated and beneath this hopper at different elevations are a series of belts each mounted in a frame so that the belt is inclined both lengthwise and transversely and with the belts so arranged that matter travelling on an incline will be discharged from the highest portion of the upper belt and dropped onto the portion of the next lower belt inclined in the opposite direction from the first belt with the high speed and the drop of the product causing a shock which contributes to the disengagement of the pulp from the seed. The belts are driven from suitable motors and gearing, a final conveyor being provided beneath the lowest belt for receiving the pulp from the lowest of the series of belts and carrying it to a remote location.

With continued reference to the drawings a generally rectangular frame 10 of angular members is provided on the upper portion of which is mounted a hopper 11 for containing a mass of seed with pulp attached and which it is desired to separate one from the other.

The hopper is provided with an angular reduced discharge 12 beneath which is mounted for receiving the seed and the pulp from the hopper an endless conveyor belt 13 mounted on spaced rollers 14 and shafts 15 carried by pillow blocks 16 fastened by means of bolts 17 to a generally rectangular frame 18, the bolts 17 extending through openings 19 and angular side members 20 with fixed end members 21. Such end members are mounted on pivots 22 carried by L-shaped supports or brackets 23 and 24, the bracket 23 having a slot 25 for receipt of a bolt or connecting element 26 which is adjustably receivable in openings 27 and spring member in the posts or upright portions of the frame 10. The L-shaped support or bracket 24 is fastened by a pivot 28 to another post of the frame 10. By this arrangement for vertical adjustment of the bracket or support 23 there is lengthwise inclination of the frame 18 permitting adjustment according to the movement of openings 27 in the frame 10, a setting of 15° having been found suitable. The opposite extremities of the end members 21 are provided with slots 29 adjustably receiving fastening bolts 30 carried by supporting brackets 23 and 24 attached to corresponding upright posts of the frame 10. Thus the rectangular frame in FIG. 6 can be adjusted to vary the inclination of the conveyor from end to end as well as the sidewise tilting of the same.

In order to drive the several conveyors motors 31 through gear boxes 32 at opposite sides of the frame 10 drive belts 33 which extend about pulleys 34 and 35 mounted on shaft 15 and driving the rollers 14. Thus by having drives at opposite sides for alternate belts, the adjacent belts move in opposite directions. The motors and gearings 31 and 32 may be fastened by bolts 36 to shelves 37 braced by brackets or members 38 attached to the frame 10.

With the arrangement of the conveyors as illustrated in FIG. 2, seed with pulp attached is placed in the hopper 11 and passes on to the uppermost belt and then to the next lower belt until travel has been made along the belts at the several elevations from the highest to the lowest, during which time the shock from the seed and pulp passing from an upper belt to the next lower belt provides a shock sufficient that when the pulp and seed have passed through the entire path of travel the seed will be discharged sidewise from the belt and the resulting pulp will be discharged onto an unloading conveyor 39 which extends about a roller 40 mounted on a shaft 41 in a pillow block 42 attached to the base of the frame member 10.

It will be apparent from the foregoing that a simple practical machine is provided for efficiently separating seed from pulp. During the process, seed from the hopper will be received on the uppermost belt conveyor traveling at a rapid rate of 259 feet, this having been found satisfactory for some purposes. The belt is inclined on one side at an adjustable angle. For example, it may average 35° and its travel will be upwardly at an adjustable angle, for example 15°, to its discharge end. Subsequent lower conveyors discharge one after another onto similar units mounted in the same manner and at the same angle and traveling at the same speed. Thus with a series of belts the process will repeat itself according to the number of belts before reaching the discharge conveyor. During this elapsed time the product is subjected to an increase in speed, multiple changes of direction and drops of approximately 14 inches in height. This causes the seed to break away from the pulp and roll off the inclined belt, but due to the moisture and gumminess of the pulp, the latter will be carried by the belt until it reaches the discharge.

In order to keep the pulp from building up an excessive accumulation on each of the belts 13 a scraper 44 may be provided.

What is claimed is:

1. Apparatus for separating relatively hard materials from relatively soft materials comprising a main frame, a plurality of auxiliary frames mounted on said main frame and normally being longitudinally and transversely inclined relative thereto, endless conveyor means mounted on each of said auxiliary frames, the discharge end of each of the upper conveyor means being disposed above the next lowermost conveyor means to permit material discharged from one conveyor means to fall by gravity onto the next lower conveyor means, and means for driving the upper run of said conveyor means in an upward direction, whereby the impact force of material engaging a conveyor means after a fall by gravity will separate hard materials from soft materials and permit said hard materials to roll downhill transversely to the movement of the conveyor means and be discharged therefrom while said soft material will be discharged from the discharge end of each conveyor means.

2. The structure of claim 1 in which alternate auxiliary frames are longitudinally inclined in opposite directions and the conveyor means carried thereby are driven in opposite directions.

3. The structure of claim 1 including hopper means for feeding materials onto the uppermost conveyor means, and means for receiving material from the lowermost conveyor means and discharging the same from said apparatus.

4. The structure of claim 1 including means for adjustably mounting said auxiliary frames on said main frame.

References Cited

UNITED STATES PATENTS

| | | | |
|---|---|---|---|
| 445,133 | 1/1891 | Cook | 209—114 |
| 1,196,048 | 8/1916 | Sutton | 209—114 |
| 2,350,332 | 6/1944 | Albaugh | 209—114 |
| 3,211,288 | 10/1965 | Peis | 209—114 X |
| 3,235,076 | 2/1966 | Snyder | 209—114 |

M. HENSON WOOD, Jr., *Primary Examiner.*

R. S. SCHACHER, *Assistant Examiner.*